United States Patent
Wilkinson et al.

(10) Patent No.: US 11,899,453 B2
(45) Date of Patent: Feb. 13, 2024

(54) SYSTEMS AND METHODS TO CONTROL AUTONOMOUS VEHICLE MOTION

(71) Applicant: UATC, LLC, Mountain View, CA (US)

(72) Inventors: Eric Lloyd Wilkinson, Pittsburgh, PA (US); Jacob Panikulam, Pittsburgh, PA (US); J. Andrew Bagnell, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/533,775

(22) Filed: Nov. 23, 2021

(65) Prior Publication Data
US 2022/0083057 A1 Mar. 17, 2022

Related U.S. Application Data

(63) Continuation of application No. 16/445,787, filed on Jun. 19, 2019, now Pat. No. 11,194,327, which is a
(Continued)

(51) Int. Cl.
*G05D 1/00* (2006.01)
*G05D 1/02* (2020.01)
(Continued)

(52) U.S. Cl.
CPC ............ *G05D 1/0066* (2013.01); *B62D 15/00* (2013.01); *G01C 21/38* (2020.08); *G05D 1/0088* (2013.01);
(Continued)

(58) Field of Classification Search
CPC .. G05D 1/0066; G05D 1/0088; G05D 1/0217; G05D 1/0221; G05D 2201/0213; B62D 15/00
See application file for complete search history.

(56) References Cited

U.S. PATENT DOCUMENTS 8,694,193 B2   4/2014  Makela
9,248,834 B1   2/2016  Ferguson
(Continued)

OTHER PUBLICATIONS

DE 102013214225 A1 with English translation. Filed Jul. 19, 2013. Published Jan. 22, 2015. (Year: 2015).*
(Continued)

*Primary Examiner* — Calvin Cheung
(74) *Attorney, Agent, or Firm* — Dority & Manning, P.A.

(57) ABSTRACT

The present disclosure provides systems and methods that control the motion of an autonomous vehicle by rewarding or otherwise encouraging progress toward a goal, rather than simply rewarding distance travelled. In particular, the systems and methods of the present disclosure can project a candidate motion plan that describes a proposed motion path for the autonomous vehicle onto a nominal pathway to determine a projected distance associated with the candidate motion plan. The systems and methods of the present disclosure can use the projected distance to evaluate a reward function that provides a reward that is positively correlated to the magnitude of the projected distance. The motion of the vehicle can be controlled based on the reward value provided by the reward function. For example, the candidate motion plan can be selected for implementation or revised based at least in part on the determined reward value.

18 Claims, 7 Drawing Sheets

Related U.S. Application Data continuation of application No. 15/473,686, filed on Mar. 30, 2017, now Pat. No. 10,345,808.

(51) Int. Cl.
  *B62D 15/00* (2006.01)
  *G01C 21/00* (2006.01)

(52) U.S. Cl.
  CPC ......... *G05D 1/0217* (2013.01); *G05D 1/0221* (2013.01); *G05D 2201/0213* (2013.01)

(56) References Cited

U.S. PATENT DOCUMENTS

| | | | |
|---|---|---|---|
| 9,733,346 | B1 | 8/2017 | Jang |
| 9,940,834 | B1 | 4/2018 | Konrardy |
| 10,019,903 | B2 | 7/2018 | Lee |
| 10,024,669 | B2 | 7/2018 | Meyer |
| 2010/0106603 | A1* | 4/2010 | Dey ................. G08G 1/096888 705/14.63 |
| 2013/0226965 | A1 | 8/2013 | Fukui |
| 2015/0006005 | A1 | 1/2015 | Yu |
| 2015/0149088 | A1* | 5/2015 | Attard .................... G05D 1/021 701/538 |
| 2015/0248132 | A1 | 9/2015 | Lee |
| 2017/0021764 | A1 | 1/2017 | Adams |
| 2017/0132934 | A1* | 5/2017 | Kentley ................. G08G 1/202 |
| 2017/0292843 | A1 | 10/2017 | Wei |
| 2018/0046192 | A1 | 2/2018 | Keller |
| 2018/0165782 | A1 | 6/2018 | Ibe |
| 2018/0203453 | A1 | 7/2018 | Hardy |

OTHER PUBLICATIONS

WO 2017137124 A1 with English translation. Filed Dec. 16, 2016. Published Aug. 17, 2017. (Year: 2017).*

Bagnell et al., "16-899C ACRL: Adaptive Control and Reinforcement Learning: Machine Learning Techniques for Decision Making, Planning, and Control", Class Syllabus, Carnegie Mellon University, Spring 2008, 4 pages.

Ferguson et al., "Motion Planning in Urban Environments Part I", International Conference on Intelligent Robots and Systems, Sep. 22-26, 2008, Nice, France, 7 pages.

Kuwata et al., "Real-Time Motion Planning with Applications to Autonomous Urban Driving", IEEE Transactions on Control Systems Technology, vol. 17, No. 5, Sep. 2009, pp. 1105-1118.

Li et al., "Vehicle Detection from 3D Lidar Using Fully Convolutional Network", arXiv:1608.07916v1, Aug. 29, 2016, 5 pages.

Miller et al., Efficient Unbiased Tracking of Multiple Dynamic Obstacles Under Large Viewpoint Changes, IEEE Transactions on Robotics, vol. 27, No. 1, Feb. 2011, pp. 29-46.

Paden et al., "A Survey of Motion Planning and Control Techniques for Self-Driving Urban Vehicles", arXiv1604.07446v1, Apr. 25, 2016, 27 pages.

Petrovskaya et al., "Model Based Vehicle Tracking for Autonomous Driving in Urban Environments", Proceedings of Robotics: Science and Systems IV, Jun. 25-28, 2008, Zurich, Switzerland, 8 pages.

Schouwenaars et al., "Safe Receding Horizon Path Planning for Autonomous Vehicles", Proceedings of the Annual Allerton Conference on Communication Control and Computing, vol. 40, No. 1, Oct. 2002, pp. 295-304.

Zelener, "Survey of Object Classification in 3D Range Scans", Technical Report, 2015, 32 pages.

* cited by examiner

600

602 IDENTIFY A PLURALITY OF NOMINAL PATHWAY LOCATIONS OF THE NOMINAL PATHWAY, WHEREIN A PLURALITY OF PATHWAY DISTANCES ARE RESPECTIVELY ASSOCIATED WITH THE PLURALITY OF NOMINAL PATHWAY LOCATIONS

604 IDENTIFY A PLURALITY OF MOTION PLAN LOCATIONS

606 DETERMINE, FOR EACH MOTION PLAN LOCATION, A PLURALITY OF L2 DISTANCES FROM EACH CANDIDATE MOTION PLAN LOCATION RESPECTIVELY TO THE PLURALITY OF NOMINAL PATHWAY LOCATIONS

608 DETERMINE, FOR EACH MOTION PLAN LOCATION, A WEIGHT FOR EACH NOMINAL PATHWAY LOCATION BASED AT LEAST IN PART ON THE L2 DISTANCE BETWEEN SUCH MOTION PLAN LOCATION AND SUCH NOMINAL PATHWAY LOCATION

610 DETERMINE, FOR EACH MOTION PLAN LOCATION, A PROJECTED SUB-DISTANCE BASED AT LEAST IN PART ON THE PLURALITY OF WEIGHTS AND THE PLURALITY OF PATHWAY DISTANCES

612 DETERMINE A PROJECTED DISTANCE FOR THE CANDIDATE MOTION PLAN BASED AT LEAST IN PART ON THE PLURALITY OF PROJECTED SUB-DISTANCES RESPECTIVELY DETERMINED FOR THE PLURALITY OF MOTION PLAN LOCATIONS

*FIG. 6*

SYSTEMS AND METHODS TO CONTROL AUTONOMOUS VEHICLE MOTION

The present application is a continuation of and claims priority to U.S. application Ser. No. 16/445,787 having a filing date of Jun. 19, 2019 and U.S. application Ser. No. 15/473,686 having a filing date of Mar. 30, 2017, both of which are incorporated by reference herein.

FIELD

The present disclosure relates generally to autonomous vehicles. More particularly, the present disclosure relates to autonomous vehicle motion planning systems that reward progress toward a goal.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to control motion of an autonomous vehicle. The method includes obtaining, by one or more computing devices, a candidate motion plan that describes a proposed motion path for the autonomous vehicle. The method includes identifying, by the one or more computing devices, a nominal pathway associated with the autonomous vehicle. The method includes projecting, by the one or more computing devices, the candidate motion plan onto the nominal pathway to determine a projected distance for the candidate motion plan. The method includes controlling, by the one or more computing devices, motion of the autonomous vehicle based at least in part on the projected distance of the candidate motion plan.

Another example aspect of the present disclosure is directed to a computer system. The computer system includes one or more processors and one or more tangible, non-transitory, computer readable media that collectively store instructions that, when executed by the one or more processors, cause the computer system to perform operations. The operations include obtaining a candidate motion plan that describes a proposed motion path for the autonomous vehicle. The operations include identifying a nominal pathway associated with the autonomous vehicle. The operations include projecting the candidate motion plan onto the nominal pathway to determine a projected distance for the candidate motion plan. The operations include controlling motion of the autonomous vehicle based at least in part on the projected distance of the candidate motion plan.

Another example aspect of the present disclosure is directed to an autonomous vehicle. The autonomous vehicle includes one or more processors. The autonomous vehicle includes a motion planning system implemented by the one or more processors. The motion planning system includes an optimization planner that searches a motion planning space to optimize a total cost associated with a motion plan. The total cost is based at least in part on one or more cost functions and a reward function that provides a reward that is positively correlated to a projected distance associated with the motion plan. The autonomous vehicle includes one or more tangible, non-transitory, computer-readable media that store instructions that, when executed by the one or more processors, cause the one or more processors perform operations. The operations include obtaining a candidate motion plan that describes a proposed motion path for an autonomous vehicle. The operations include identifying a nominal pathway associated with the autonomous vehicle. The operations include projecting the candidate motion plan onto the nominal pathway to determine a projected distance for the candidate motion plan.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a flowchart diagram of an example method for projecting a candidate motion plan onto a nominal pathway according to example embodiments of the present disclosure.

DETAILED DESCRIPTION

Figure 1:
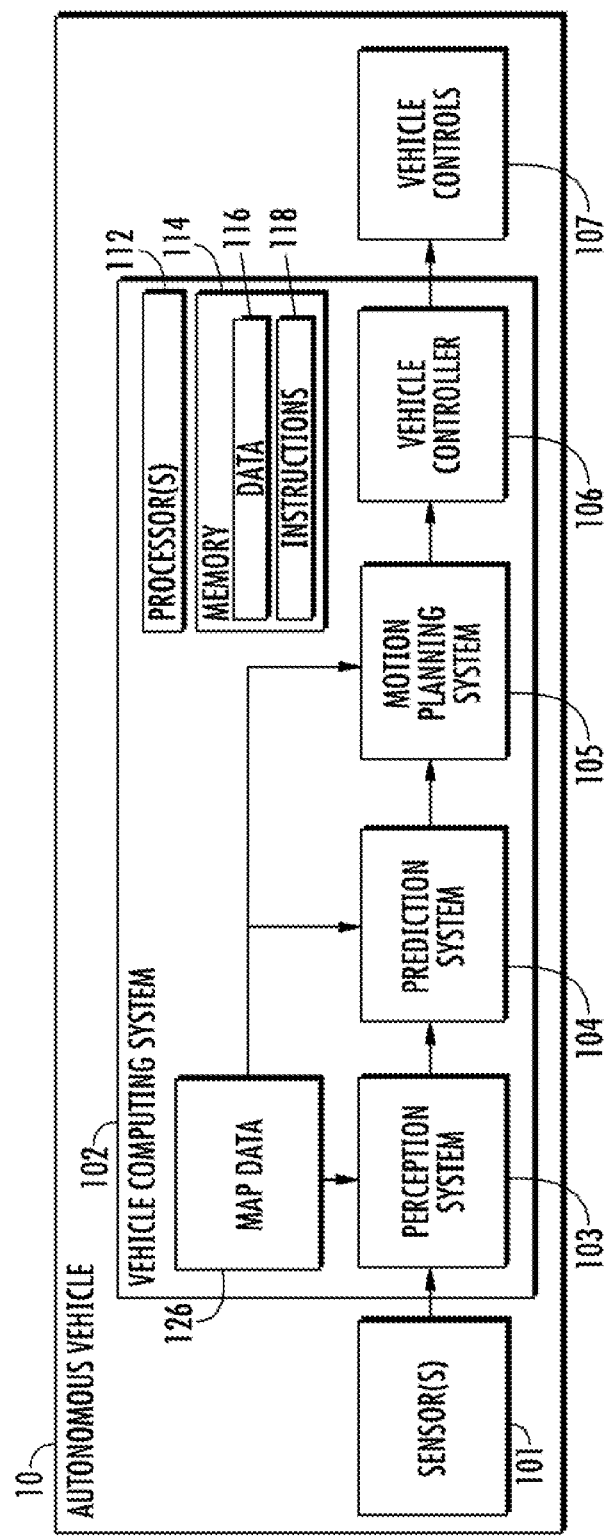
FIG. 1 depicts a block diagram of an example autonomous vehicle computing system according to example embodiments of the present disclosure.

Generally, the present disclosure is directed to systems and methods that control the motion of an autonomous vehicle by rewarding or otherwise encouraging progress toward a goal, rather than simply rewarding distance travelled. In particular, the systems and methods of the present disclosure can project a candidate motion plan that describes a proposed motion path for the autonomous vehicle onto a nominal pathway to determine a projected distance associated with the candidate motion plan. For example, the nominal pathway can correspond to a center line of one or more lanes in which the autonomous vehicle intends to travel (e.g., to complete a route). The systems and methods of the present disclosure can use the projected distance to evaluate a reward function that provides a reward that is correlated (e.g., positively correlated) to the magnitude of the projected distance. The motion of the vehicle can be controlled based on the reward value provided by the reward function. For example, the candidate motion plan can be selected for implementation or revised based at least in part on the determined reward value.

Thus, in one particular example of the present disclosure, a motion planning system associated with (e.g., included on-board) an autonomous vehicle can include an optimization planner that searches over a motion planning space to optimize a total cost associated with the motion plan of an autonomous vehicle. In particular, according to an aspect of the present disclosure, the total cost can be based at least in part on the reward function that provides the reward that is correlated to the magnitude of the projected distance. The motion plan that optimizes (e.g., locally optimizes) the total cost can be selected for implementation by the autonomous vehicle.

In such fashion, the autonomous vehicle can be rewarded or otherwise encouraged to select and implement motion plans that result in progress along the nominal pathway, without requiring the autonomous vehicle to actually adhere to or otherwise strictly follow the nominal pathway. As one example result, when making a turn, rather than simply following the nominal pathway which may, for example, correspond to a center line of one or more lanes, an autonomous vehicle can make tighter turns that feel more natural to human passengers of the autonomous vehicle. For example, the turns can be more akin to traditional human driving behavior. In particular, these tighter turns can be encouraged since they provide for a larger projected distance and, therefore, reward, in the same amount of time. Thus, by rewarding or otherwise encouraging progress toward a goal, rather than simply rewarding distance travelled, the systems and methods of the present disclosure can result in autonomous vehicle performance (e.g., turning performance) that is both more efficient and more natural feeling for human passengers.

More particularly, in some implementations, an autonomous vehicle can include a computing system that assists in controlling the autonomous vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

In addition, according to an aspect of the present disclosure, the map data can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

As further examples, a nominal pathway can generally describe a path by which a vehicle may: continue according to its current lane; merge from its current lane into an adjacent lane; turn from the current lane into an adjacent road portion; or other pathways that correspond to other driving actions. Thus, in many instances, a nominal pathway may closely correspond to the lane information that describes the location and direction of various traffic lanes. Traffic lanes can be defined and/or marked areas or volumes for travel along a travelway such as a roadway or airspace.

In some implementations, the nominal pathways can be predefined and stored in a memory of the autonomous vehicle and then accessed and used according to the present disclosure. In particular, the nominal pathway data can provide pathways along which the motion of the autonomous vehicle is designed, suggested, or guided to follow. As such, the autonomous vehicle can use the nominal pathway data in planning its own path or other motion.

As a result, in some example instances that contrast with the techniques of present disclosure, an autonomous vehicle can simply follow a nominal pathway when making a turn from a first lane into a second lane. For example, the autonomous vehicle can follow a center line of the first lane until it approximately reaches a center line of the second lane. At such point, the autonomous vehicle can make a broad or wide turn from the center line of the first lane toward the center line of the second lane.

However, turns that closely follow the nominal pathway, as described immediately above, tend to feel unnatural to human passengers of the autonomous vehicle. In particular, such turns that adhere to the nominal pathway tend to feel over-broad or unnecessarily wide to human passengers. Stated differently, such turns deviate from traditional human driving behavior that tightly turns around corners and therefore feel unnatural to human passengers.

Therefore, according to an aspect of the present disclosure, the systems and methods described herein can reward or otherwise encourage progress toward a goal, rather than simply rewarding distance travelled and/or rewarding the vehicle for adhering to the nominal pathway. As a result, when making a turn, rather than simply following the nominal pathway as described above, an autonomous vehicle can make tighter turns that feel more natural to human passengers of the autonomous vehicle. For example, the turns can be more akin to traditional human driving behavior. In particular, as will be described further below, these tighter turns can be encouraged since they result in or otherwise correspond to a larger projected distance and, therefore, reward, in the same amount of time as alternative motion plans.

Referring again to the computing system of the autonomous vehicle, the perception system can identify one or more objects that are proximate to the autonomous vehicle based on sensor data received from the one or more sensors and/or the map data. In particular, in some implementations, the perception system can provide, for each object, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle versus pedestrian versus bicycle), and/or other state information.

According to an aspect of the present disclosure, the prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system.

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations.

As one example, in some implementations, the motion planning system can include an optimization planner that searches (e.g., iteratively searches) over a motion planning space (e.g., an available control space) to identify a motion plan that optimizes (e.g., locally optimizes) a total cost associated with the motion plan. For example, the optimization planner can iteratively evaluate and modify a candidate motion plan until the total cost is optimized.

According to an aspect of the present disclosure, the total cost can be based at least in part on one or more cost functions and one or more reward functions. For example, the reward function can provide a reward that is of opposite sign to a cost provided by the one or more cost functions. In one example implementation, the total cost equals the sum of all costs minus the sum of all rewards and the optimization planner attempts to minimize the total cost.

To provide an example for the purpose of illustration: a first example cost function can provide a first cost that is negatively correlated to a magnitude of a first distance from the autonomous vehicle to a lane boundary. Thus, if a candidate motion plan approaches a lane boundary, the first cost increases, thereby discouraging (e.g., through increased cost penalization) the autonomous vehicle from selecting motion plans that come close to or cross over lane boundaries. This first example cost function is provided only as an example cost function to illustrate the principle of cost. The first cost function is not required to implement the present disclosure. Many other and different cost functions can be employed in addition or alternatively to the first cost function described above.

In addition, according to an aspect of the present disclosure, the motion planning system can employ a reward function that rewards or otherwise encourages progress toward a goal, rather than simply rewarding distance travelled.

More particularly, in contrast to the techniques of the present disclosure, one possible alternative reward function can provide a reward that is positively correlated to the velocity of vehicle (e.g., the reward can be based on a sum of magnitude of velocity vectors of the candidate motion plan). Thus, the autonomous vehicle is simply rewarded for traveling at a higher velocity, without consideration of whether such velocity is necessarily in furtherance of a goal (e.g., completion of a trip or route). In a related approach, another possible alternative reward function can provide a reward that is positively correlated to a distance traveled, again regardless of whether such distance traveled is in furtherance of the goal. As a result, the autonomous vehicle can be rewarded for executing motion plans that, at least in some respects, do not advance the overarching goal. For example, if the reward is simply based on distance traveled, the autonomous vehicle can be rewarded for taking overbroad turns, making weaving motions, or executing other motion plans that increase the distance traveled without necessarily furthering completion of the goal.

Therefore, according to another aspect, the motion planning systems of the present disclosure can employ a reward function that rewards or otherwise encourages progress toward a goal, rather than simply rewarding distance travelled. In particular, one example reward function can provide a reward that is correlated to the magnitude of a projected distance of the candidate motion plan. In particular, the reward can be positively correlated to the projected distance such that the reward increases as the projected distance increases. The projected distance can correspond to a projection of the candidate motion plan onto a nominal pathway associated with the autonomous vehicle.

Various techniques can be used to project the candidate motion plan onto the nominal pathway to obtain the projected distance. In one example technique that will be discussed in further detail below, a plurality of plan locations can be identified on the candidate motion plan and a plurality of pathway locations can be identified on the nominal pathway. A plurality of pathway distances can be respectively associated with the plurality of pathway locations. For example, the pathway distance for a particular pathway location can describe a distance along the nominal pathway at which such nominal pathway location is located (e.g., by following the nominal pathway to the particular pathway location).

In some implementations, a projected sub-distance can be determined for each of the plurality of plan locations. As an example, in some implementations, to determine the projected sub-distance for a particular plan location, a respective weight can be identified for the particular plan location and each pathway location. In some implementations, the weight for each pair of plan location and pathway location can be negatively correlated to a distance (e.g., an L2 distance) between the pair of plan location and pathway location.

In some implementations, the projected sub-distance for a particular plan location can equal or otherwise correspond to a sum, for all of the plurality of pathway locations, of the weight for each pathway location relative to the particular plan location multiplied by the pathway distance of such pathway location divided by a sum of the weights for all of the pathway locations relative to the particular plan location.

In addition, in some implementations, the projected distance for the plan can equal or otherwise correspond to a sum of the projected sub-distances for the plurality of plan locations. The projected sub-distances can be weighted or unweighted.

Thus, the example projection technique described above enables determination of a projected distance that represents a candidate motion plan projected onto a nominal pathway. In particular the projected distance provided by the above described projection technique provides one metric representative of progress toward the goal of completing a route (e.g., as represented by the nominal pathway).

In other implementations, different projection techniques or other metrics for representing progress toward a goal can be used. For example, additional projection techniques include the magnetic dipole distance technique, a smooth distance technique, orthogonal projection techniques, projection techniques that determine an angle (e.g., rather than distances) between plan locations and pathway locations, and/or other projection techniques. In addition, in various implementations, averaging and/or weighting can be performed using Gaussian distributions, Poisson distributions, or other distributions.

As described above, the motion planning system can employ a reward function that provides a reward that is positively correlated to the magnitude of the projected distance. In such fashion, the autonomous vehicle can be rewarded or otherwise encouraged to select and implement motion plans that result in progress along the nominal pathway, without requiring the autonomous vehicle to actually adhere to or otherwise strictly follow the nominal pathway.

The optimization planner can identify the candidate motion plan that strikes the optimal balance between the magnitude of reward achieved and the magnitude of cost incurred. Once the optimization planner has identified the optimal candidate motion plan (or some other iterative break occurs), the optimal candidate motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan.

One technical effect and benefit of the present disclosure is improved control of autonomous vehicles when making turns. In particular, when making a turn, rather than simply following a nominal pathway which may, for example, correspond to a center line of one or more lanes, an autonomous vehicle can make tighter turns that feel more natural to human passengers of the autonomous vehicle. For example, the turns can be more akin to traditional human driving behavior. In particular, these tighter turns can be encouraged since they result in or otherwise correspond to a larger projected distance and, therefore, reward.

Thus, by rewarding or otherwise encouraging progress toward a goal, rather than simply rewarding distance travelled, the systems and methods of the present disclosure can result in autonomous vehicle performance (e.g., turning performance) that is both more efficient and more natural feeling for human passengers.

In particular, the present disclosure provides techniques that enable a computing system to perform autonomous vehicle control with turning maneuvers that were heretofore unobtainable using existing computers or control systems. Thus, the present disclosure improves the operation of an autonomous vehicle computing system and the autonomous vehicle it controls.

In addition, the present disclosure provides a particular solution to the problem of autonomous vehicle turning and provides a particular way (e.g., rewarding projected distance of a candidate motion plan onto a nominal pathway) to achieve the desired outcome.

The present disclosure also provides additional technical effects and benefits, including, for example, enhancing passenger comfort and improving vehicle efficiency by reducing turn width and driving time.

With reference now to the Figures, example embodiments of the present disclosure will be discussed in further detail.

Example Devices and Systems

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system 4 can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

In addition, according to an aspect of the present disclosure, the map data 126 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

As further examples, a nominal pathway can generally describe a path by which a vehicle may: continue according to its current lane; merge from its current lane into an adjacent lane; turn from the current lane into an adjacent road portion; or other pathways that correspond to other driving actions. Thus, in many instances, a nominal pathway may closely correspond to the lane information that describes the location and direction of various traffic lanes. Traffic lanes can be defined and/or marked areas or volumes for travel along a travelway such as a roadway or airspace.

In some implementations, the nominal pathways can be predefined and then accessed and used according to the present disclosure. In particular, the nominal pathway data can provide pathways along which the motion of the autonomous vehicle 10 is designed, suggested, or guided to follow. As such, the autonomous vehicle 10 can use the nominal pathway data in planning its own path or other motion.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions and one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations of objects, the motion planning system 105 can determine a total cost (e.g., a sum of the cost(s) and reward(s) provided by the cost function(s) and reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
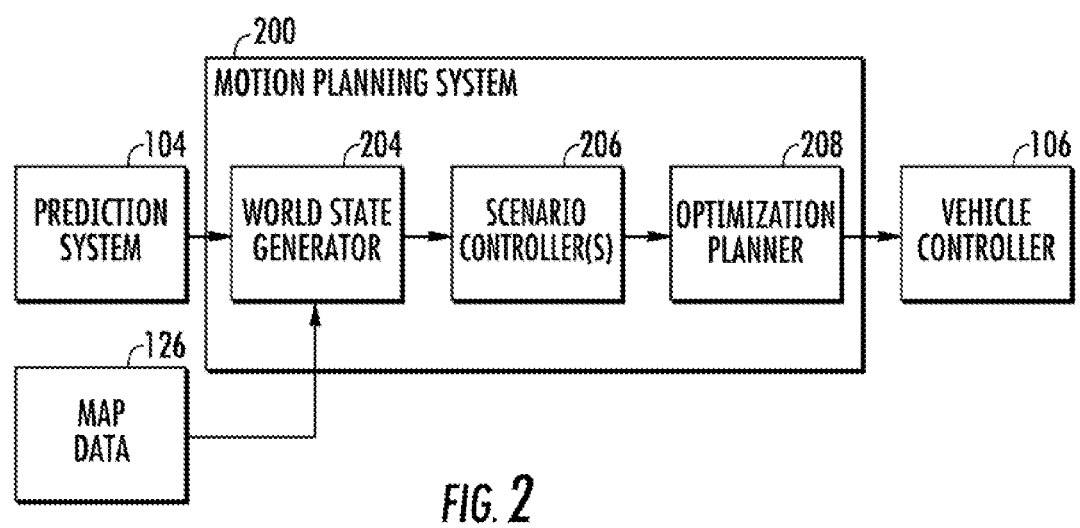
FIG. 2 depicts a block diagram of an example motion planning system according to example embodiments of the present disclosure.

FIG. 2 depicts a block diagram of an example motion planning system 200 according to example embodiments of the present disclosure. The example motion planning system 105 includes a world state generator 204, one or more scenario controllers 206, and an optimization planner 208.

The world state generator 204 can receive information from the prediction system 104, the map data 126, and/or other information such as vehicle pose, a current route, or other information. The world state generator 204 can synthesize all received information to produce a world state that describes the state of all objects in and other aspects of the surrounding environment of the autonomous vehicle at each time step.

The scenario controller(s) 206 can detect certain scenarios (e.g., a changing lanes scenario versus a queueing scenario) and guide the behavior of the autonomous vehicle according to the selected scenario. Thus, the scenario controller(s) can make discrete-type decisions (e.g., should the autonomous vehicle turn left, turn right, change lanes, etc.) and can control motion of the vehicle based on such decisions. In some implementations, each of the scenario controller(s) 206 can be a classifier (e.g., a machine-learned classifier) designed to classify the current state of the world as either included or excluded from one or more corresponding scenarios. In some implementations, the scenario controller(s) 206 can operate at each time step.

As examples, the scenario controllers 206 can include one or more of: a pass, ignore, queue controller that decides, for each object in the world, whether the autonomous vehicle should pass, ignore, or queue such object; a yield controller that decides, for each adjacent vehicle in the world, whether the autonomous vehicle should yield to such vehicle; a lane change controller that identifies whether and when to change lanes; and/or a speed regressor that determines an appropriate driving speed for each time step. These scenario controllers 206 are provided as examples only. Alternative and/or additional scenario controllers 206 can be used. In some implementations of the present disclosure, the motion planning system 200 does not include or implement the scenario controllers 206.

According to another aspect of the present disclosure, the motion planning system 200 can include an optimization planner 208 that searches (e.g., iteratively searches) over a motion planning space (e.g., an available control space) to identify a motion plan that optimizes (e.g., locally optimizes) a total cost associated with the motion plan. For example, the optimization planner can iteratively evaluate and modify a candidate motion plan until the total cost is optimized.

Figure 3:
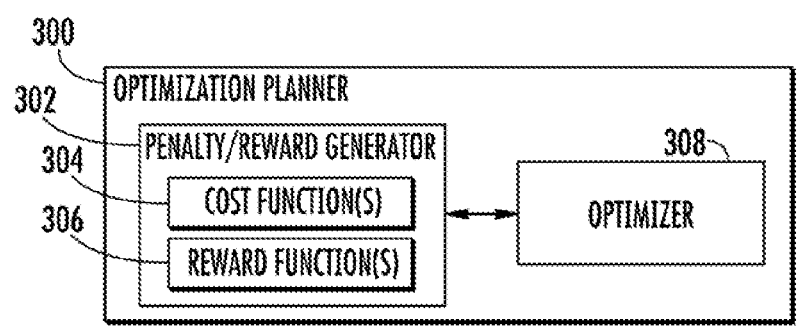
FIG. 3 depicts a block diagram of an example optimization planner according to example embodiments of the present disclosure.

FIG. 3 depicts a block diagram of an example optimization planner 300 according to example embodiments of the present disclosure. As described above, the optimization planner 300 can iteratively search over a motion planning space (e.g., an available control space) to identify a motion plan that optimizes (e.g., locally optimizes) a total cost associated with the motion plan. In particular, the example optimization planner 300 can implement an optimizer 308 to optimize the total cost. The optimizer 308 can be or include a solver (e.g., an iterative solver) or other optimization tool that is able to optimize the total cost. In some implementations, the optimizer 308 is an iterative linear quadratic regulator.

According to an aspect of the present disclosure, the total cost can be based at least in part on one or more cost functions 304 and one or more reward functions 306. For example, the reward function 306 can provide a reward that is of opposite sign to a cost provided by the one or more cost functions. In one example implementation, the total cost equals the sum of all costs minus the sum of all rewards and the optimization planner attempts to minimize the total cost.

In some implementations, different cost function(s) 304 and/or different reward function(s) 306 can be used depending upon a particular scenario that is provided to the optimization planner 300. For example, as described above, a motion planning system can include a plurality of scenario controllers that detect certain scenarios (e.g., a changing lanes scenario versus a queueing scenario) and guide the behavior of the autonomous vehicle according to the selected scenario. Different sets of one or more cost functions 304 and/or one or more reward functions 306 can correspond to the different possible scenarios and a penalty/reward generator can load the cost function(s) 304 and/or reward functions 306 corresponding to the selected scenario at each instance of motion planning. In other implementations, the same cost function(s) 304 and/or reward function(s) 306 can be used at each instance of motion planning (e.g., no particular scenarios are used). In some implementations, the optimization planner 300 does not include the penalty/reward generator 302.

To provide an example cost function 304 for the purpose of illustration: a first example cost function can provide a first cost that is negatively correlated to a magnitude of a first distance from the autonomous vehicle to a lane boundary.

Thus, if a candidate motion plan approaches a lane boundary, the first cost increases, thereby discouraging (e.g., through increased cost penalization) the autonomous vehicle from selecting motion plans that come close to or cross over lane boundaries. This first example cost function is provided only as an example cost function to illustrate the principle of cost. The first cost function is not required to implement the present disclosure. Many other and different cost functions 304 can be employed in addition or alternatively to the first cost function described above.

In addition, according to an aspect of the present disclosure, the motion planning system can employ a reward function 306 that rewards or otherwise encourages progress toward a goal, rather than simply rewarding distance travelled. In particular, the reward function 306 can provide a reward that is positively correlated to the magnitude of a projected distance of the candidate motion plan. The projected distance can correspond to a projection of the candidate motion plan onto a nominal pathway associated with the autonomous vehicle.

Various techniques can be used to project the candidate motion plan onto the nominal pathway to obtain the projected distance. One example technique will be discussed below with reference to FIG. 6. In other implementations, different projection techniques or other metrics for representing progress toward a goal can be used.

Thus, the optimization planner can optimize over a set of cost function(s) 304 and reward function(s) 306 that includes a reward function 306 that provides a reward that is positively correlated to the magnitude of the projected distance. In such fashion, the optimization planner 300 can be rewarded or otherwise encouraged to select motion plans that result in progress along the nominal pathway, without requiring the autonomous vehicle to actually adhere to or otherwise strictly follow the nominal pathway.

Referring again to FIG. 2, once the optimization planner 208 has identified the optimal candidate motion plan (or some other iterative break occurs), the optimal candidate motion plan can be selected and executed by the autonomous vehicle. For example, the motion planning system 200 can provide the selected motion plan to a vehicle controller 106 that controls one or more vehicle controls (e.g., actuators that control gas flow, steering, braking, etc.) to execute the selected motion plan.

Each of the world state generator 204, scenario controller(s) 206, the optimization planner 208, and penalty/reward generator 302 can include computer logic utilized to provide desired functionality. In some implementations, each of world state generator 204, scenario controller(s) 206, the optimization planner 208, and penalty/reward generator 302 can be implemented in hardware, firmware, and/or software controlling a general purpose processor. For example, in some implementations, each of world state generator 204, scenario controller(s) 206, the optimization planner 208, and penalty/reward generator 302 includes program files stored on a storage device, loaded into a memory and executed by one or more processors. In other implementations, each of world state generator 204, scenario controller(s) 206, the optimization planner 208, and penalty/reward generator 302 includes one or more sets of computer-executable instructions that are stored in a tangible computer-readable storage medium such as RAM hard disk or optical or magnetic media.

Example Improved Turn

Figure 4:
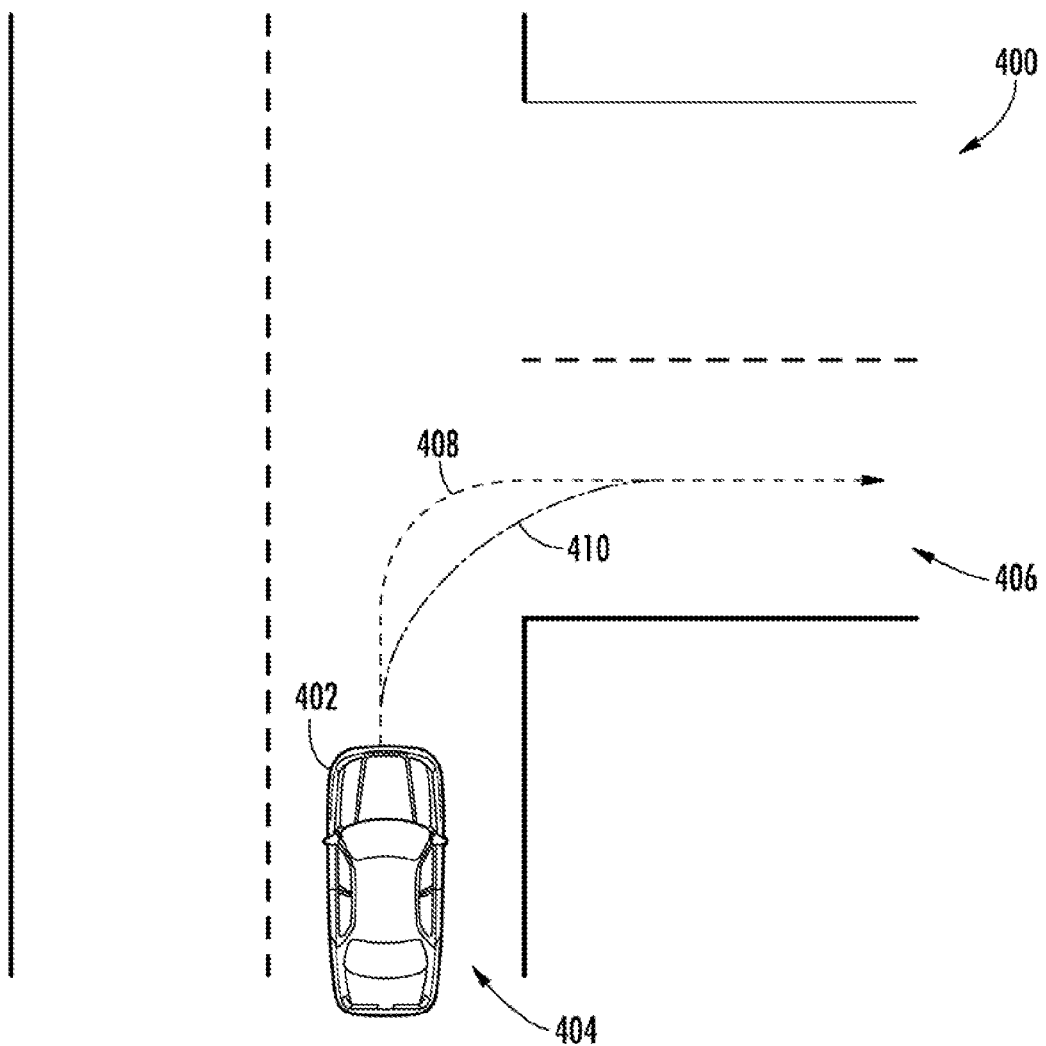
FIG. 4 depicts a graphical diagram of an example turn performed by an autonomous vehicle according to example embodiments of the present disclosure.

FIG. 4 depicts a graphical diagram 400 of an example turn performed by an autonomous vehicle 402 according to example embodiments of the present disclosure. In particular, the graphical diagram 400 illustrates the autonomous vehicle 402 turning from a first lane 404 into a second lane 406.

More particularly, in some example instances that contrast with the techniques of present disclosure, an autonomous vehicle 402 can simply follow a nominal pathway 408 when making a turn from the first lane 404 into the second lane 406. For example, the autonomous vehicle 402 can follow a center line of the first lane 404 until it approximately reaches a center line of the second lane 406. At such point, the autonomous vehicle 402 can make a broad or wide turn from the center line of the first lane 404 toward the center line of the second lane 406.

However, turns that closely follow the nominal pathway 408, as described immediately above, tend to feel unnatural to human passengers of the autonomous vehicle 402. In particular, such turns that adhere to the nominal pathway 408 tend to feel over-broad or unnecessarily wide to human passengers. Stated differently, such turns deviate from traditional human driving behavior that tightly turns around corners and therefore feel unnatural to human passengers.

Therefore, according to an aspect of the present disclosure, the autonomous vehicle 402 can be rewarded or otherwise encouraged to select and implement a motion plan 410 that results in progress along the nominal pathway 408, without requiring the autonomous vehicle 10 to actually adhere to or otherwise strictly follow the nominal pathway 408. As one example result, when making a turn, rather than simply following the nominal pathway 408 which may, for example, correspond to a center line of the lanes 404 and 406, the autonomous vehicle 402 can execute a motion plan 410 that includes a tighter turn that feels more natural to human passengers of the autonomous vehicle. For example, the turn of the motion plan 410 can be more akin to traditional human driving behavior.

In particular, the motion plan 410 with the tighter turn can be encouraged since it provides for a larger projected distance and, therefore, reward, in the same amount of time. Thus, by rewarding or otherwise encouraging progress toward a goal, rather than simply rewarding distance travelled, the systems and methods of the present disclosure can result in autonomous vehicle performance (e.g., turning performance) that is both more efficient and more natural feeling for human passengers.

Example Methods

Figure 5:
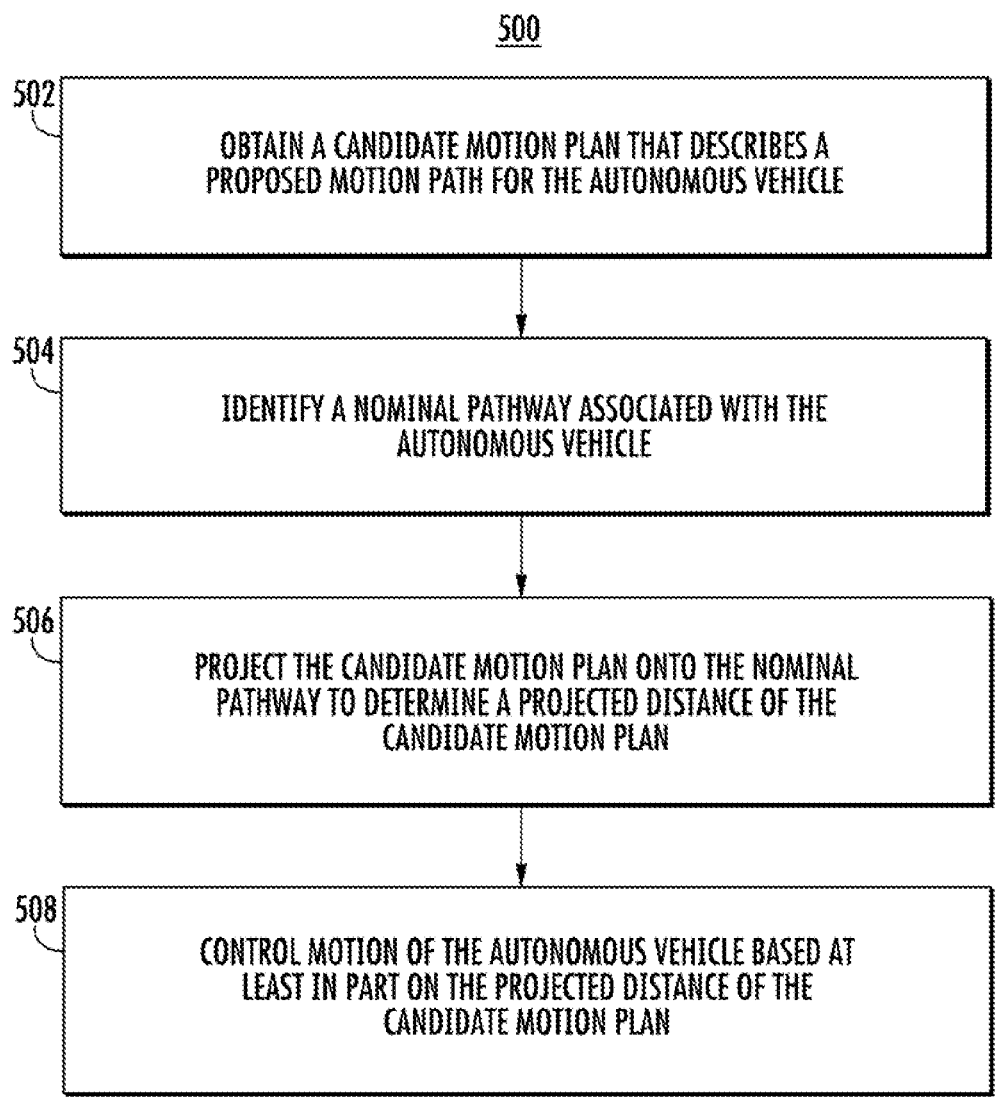
FIG. 5 depicts a flowchart diagram of an example method for controlling motion of an autonomous vehicle according to example embodiments of the present disclosure.

FIG. 5 depicts a flowchart diagram of an example method 500 for controlling motion of an autonomous vehicle according to example embodiments of the present disclosure.

At 502, a computing system obtains a candidate motion plan that describes a proposed motion path for the autonomous vehicle. For example, the computing system can include an optimization planner that iteratively optimizes a total cost associated with the candidate motion plan. Thus, the optimization planner can iteratively update the candidate motion plan to improve (e.g., reduce) the total cost. As such, at a first instance of 502, a first candidate motion plan (e.g., a motion plan provided by a warm start generator) can be obtained. At subsequent instances of 502, an updated candidate motion plan can be obtained.

At 504, the computing system identifies a nominal pathway associated with the autonomous vehicle. For example, the nominal pathway can be identified based on a current route of the autonomous vehicle. As one example, the nominal pathway can correspond to one or more center lines of one or more lanes via which the autonomous vehicle is expected to travel to complete the route and/or one or more turns between such lanes and/or their respective center lines.

At 506, the computing system projects the candidate motion plan onto the nominal pathway to determine a projected distance for the candidate motion plan. For example, one or more of various projection techniques can be performed at 506 to determine the projected distance for the candidate motion plan.

As one example technique, FIG. 6 depicts a flowchart diagram of an example method 600 for projecting a candidate motion plan onto a nominal pathway according to example embodiments of the present disclosure.

At 602, a computing system identifies a plurality of nominal pathway locations of the nominal pathway. A plurality of pathway distances are respectively associated with the plurality of nominal pathway locations.

Figure 7:
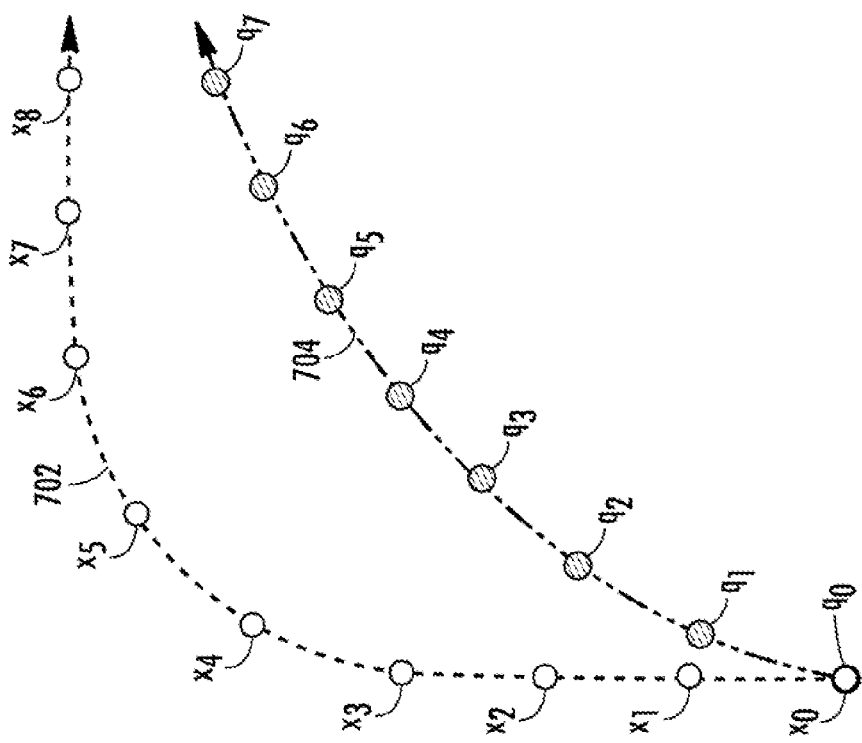
FIG. 7 depicts a graphical diagram of an example nominal pathway and candidate motion plan according to example embodiments of the present disclosure.

As one example, FIG. 7 depicts a graphical diagram of an example nominal pathway 702 and an example candidate motion plan 704 according to example embodiments of the present disclosure. A plurality of nominal pathway locations $x_i$ are illustrated on the nominal pathway 702. In particular, nine nominal pathway locations are illustrated. Any number N of nominal pathway locations can be identified; nine is shown only as an example. As an example, approximately one hundred nominal pathway locations can be identified per instance of projection. In some implementations, the plurality of nominal pathway locations $x_i$ are evenly spaced. In some implementations, the plurality of nominal pathway locations $x_i$ are unevenly spaced. In some implementations, the plurality of nominal pathway locations $x_i$ are sampled until a threshold distance along the nominal pathway 702 has been reached.

Figure 8:
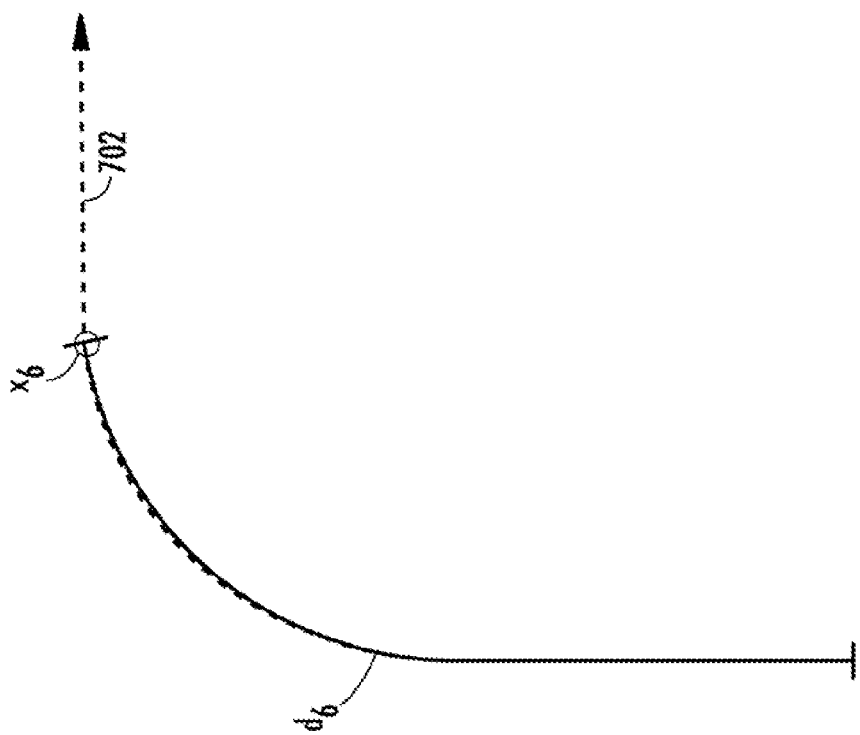
FIG. 8 depicts a graphical diagram of an example pathway distance according to example embodiments of the present disclosure.

A plurality of pathway distances $d_i$ are respectively associated with the plurality of nominal pathway locations $x_i$. As one example, FIG. 8 depicts a graphical diagram of an example pathway distance according to example embodiments of the present disclosure. In particular, FIG. 8 illustrates an example pathway distance $d_6$ associated with an example nominal pathway location $x_6$. The nominal pathway distance for each nominal pathway location is descriptive of a distance along the nominal pathway at which such nominal pathway location is located Referring again to FIG. 6, at 604, the computing system identifies a plurality of motion plan locations. As an example, referring again to FIG. 7, a plurality of motion plan locations $q_j$ are illustrated on the motion plan 704. In particular, eight motion plan locations are illustrated. Any number M of motion plan locations can be identified; eight is shown only as an example. As an example, approximately one hundred motion plan locations can be identified per instance of projection. In some implementations, the plurality of motion plan locations $q_j$ are evenly spaced. In some implementations, the plurality of motion plan locations $q_j$ are unevenly spaced. In some implementations, the plurality of motion plan locations $q_j$ are sampled until a threshold distance along the motion plan 704 has been reached. In some implementations, the number M of motion plan locations equals the number N of nominal pathway locations. In some implementations, the number M of motion plan locations does not equal the number N of nominal pathway locations.

Referring again to FIG. 6, at 606, the computing system determines, for each motion plan location, a plurality of L2 distances from each candidate motion plan location respectively to the plurality of nominal pathway locations.

As an example, in some implementations, an L2 distance d* between a given pair of plan location and pathway location can be determined using the following equation:

$$d^*(q_j, x_i) = \|q_j - x_i\|$$

Figure 9:
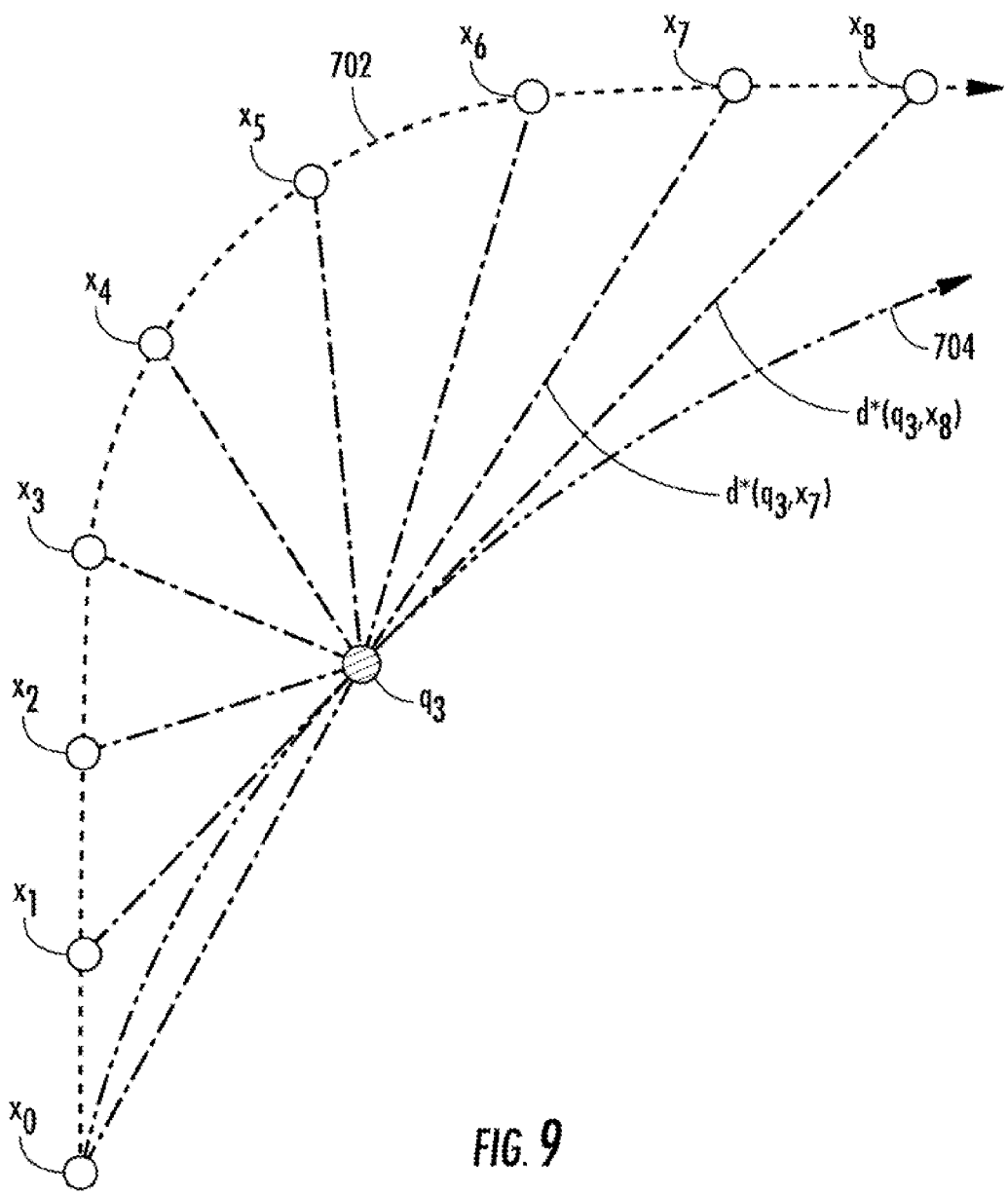
FIG. 9 depicts a graphical diagram of example distances between a plan location and pathway locations according to example embodiments of the present disclosure.

As one example, FIG. 9 depicts a graphical diagram of example distances between a plan location $q_3$ and each pathway location $x_i$ according to example embodiments of the present disclosure.

Referring again to FIG. 6, at 608, the computing system determines, for each motion plan location, a weight for each nominal pathway location based at least in part on the L2 distance between such motion plan location and such nominal pathway location. In some implementations, the magnitude of the weight for a given pair of plan location and pathway location can be negatively correlated to the L2 distance between such motion plan location and such nominal pathway location.

As one example, in some implementations, the weight w for a given pair of plan location and pathway location can be determined using the following equation:

$$w_{j,i} = \exp(-d^*(q_j, x_i)) = \exp(-\|q_j - x_i\|)$$

As another example, in some implementations, the weight w for a given pair of plan location and pathway location can also be influenced by a temperature parameter T. For example, the temperature parameter can be a scalar. In some implementations, the temperature parameter can control how smooth the projection function is. As an example, in some implementations, the weight w for a given pair of plan location and pathway location can be determined using the following equation:

$$w_{j,i} = \exp(-T d^*(q_j, x_i)) = \exp(-T \|q_j - x_i\|)$$

At 610, the computing system determines, for each motion plan location, a projected sub-distance based at least in part on the plurality of weights and the plurality of pathway distances. In some implementations, the projected sub-distance for a particular plan location can equal or otherwise correspond to a sum, for all of the plurality of pathway locations, of the weight for each pathway location relative to the particular plan location multiplied by the pathway distance of such pathway location divided by a sum of the weights for all of the pathway locations relative to the particular plan location.

As an example, in some implementations, the projected sub-distance for a particular motion plan location $q_j$ can be determined using the following equation.

$$proj_{d(q_j)} = \sum_i^N \frac{w_{j,i} d_i}{\sum_i^N w_{j,i}}$$

At 612, the computing system determines a projected distance for the candidate motion plan based at least in part on the plurality of projected sub-distances respectively determined for the plurality of motion plan locations. In some implementations, the projected distance for the plan can equal or otherwise correspond to a sum of the projected sub-distances for the plurality of plan locations. The projected sub-distances can be weighted or unweighted.

In some implementations, determining the projected distance for the candidate motion plan at 612 can include evaluating a reward function based on the projected sub-distances.

As an example, in some implementations, the reward function for a particular plan p can be the following equation, where γ is a discount factor.

$$R(p) = \left( \sum_{j=0}^{M-1} \gamma^j (1-\gamma) proj_{d(q_j)} \right) + \gamma^M proj_{d(q_M)}$$

FIG. 6 provides one example projection technique. In other implementations, different projection techniques or other metrics for representing progress toward a goal can be used to project the candidate motion plan at 506 of FIG. 5. For example, additional projection techniques include the magnetic dipole distance technique, a smooth distance technique, orthogonal projection techniques, projection techniques that determine an angle (e.g., rather than distances) between plan locations and pathway locations, and/or other projection techniques. In addition, in various implementations, averaging and/or weighting can be performed using Gaussian distributions, Poisson distributions, or other distributions.

Referring again to FIG. 5, after determining the projected distance for the candidate motion plan at 506, then at 508, the computing system controls motion of the autonomous vehicle based at least in part on the projected distance of the candidate motion plan. For example, as described above, the projected distance can impact a reward provided by a reward function. The reward can contribute to a total cost. The candidate motion plan can be iteratively updated until the total cost is minimized (e.g., locally minimized).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 5 and 6 respectively depict steps performed in a particular order for purposes of illustration and discussion, the methods of the present disclosure are not limited to the particularly illustrated order or arrangement. The various steps of the methods 500 and 600 can be omitted, rearranged, combined, and/or adapted in various ways without deviating from the scope of the present disclosure.

What is claimed is:

1. A computer-implemented method to control motion of an autonomous vehicle, the method comprising:
    obtaining a candidate motion plan that describes a proposed motion path for the autonomous vehicle;
    identifying a nominal pathway associated with the autonomous vehicle, wherein the candidate motion plan deviates from the nominal pathway and wherein the nominal pathway comprises a plurality of nominal pathway locations;
    projecting the candidate motion plan onto the nominal pathway to determine a projected distance along the nominal pathway for the candidate motion plan;
    selecting the candidate motion plan for implementation based at least in part on the projected distance; and
    executing one or more control signals to control the motion of the autonomous vehicle based on the candidate motion plan.

2. The computer-implemented method of claim 1, wherein the nominal pathway corresponds to a center line of one or more lanes in which the autonomous vehicle intends to travel.

3. The computer-implemented method of claim 1, wherein projecting the candidate motion plan onto the nominal pathway to determine the projected distance along the nominal pathway for the candidate motion plan, comprises:
    determining a plurality of candidate motion plan locations for the candidate motion plan; and
    determining the projected distance along the nominal pathway for the candidate motion plan based on a comparison of the plurality of nominal pathway locations to the plurality of candidate motion plan locations.

4. The computer-implemented method of claim 3, wherein the projected distance along the nominal pathway is based on an L2 distance from at least one of the plurality of candidate motion plan locations to at least one of the nominal pathway locations.

5. The computer-implemented method of claim 4, wherein determining the projected distance along the nominal pathway for the candidate motion plan comprises:
    evaluating a reward function based on the L2 distance from the at least one of the plurality of candidate motion plan locations to the at least one of the nominal pathway locations.

6. The computer-implemented method of claim 1, further comprising
    assigning one or more weights to the candidate motion plan based on the projected distance for the candidate motion plan; and
    selecting the candidate motion plan for implementation based at least in part on the one or more weights.

7. The computer-implemented method of claim 6, wherein the one or more weights are determined based on a scalar parameter configured to control a smoothness of a projection function for projecting the candidate motion plan onto the nominal pathway.

8. The computer-implemented method of claim 1, wherein the projected distance is determined based on a sum of a plurality of sub-distances.

9. The computer-implemented method of claim 8, wherein the sub-distances are weighted.

10. The computer-implemented method of claim 8, wherein the sub-distances are unweighted.

11. A vehicle control system comprising:
one or more processors; and
one or more non-transitory computer-readable media that store instructions that, when executed by the one or more processors, cause the vehicle control system to perform operations, the operations comprising:
obtaining a candidate motion plan that describes a proposed motion path for an autonomous vehicle;
identifying a nominal pathway associated with the autonomous vehicle, wherein the candidate motion plan deviates from the nominal pathway and wherein the nominal pathway comprises a plurality of nominal pathway locations;
projecting the candidate motion plan onto the nominal pathway to determine a projected distance along the nominal pathway for the candidate motion plan;
selecting the candidate motion plan for implementation based at least in part on the projected distance; and
executing one or more control signals to control the motion of the autonomous vehicle: based on the candidate motion plan.

12. The vehicle control system of claim 11, wherein the nominal pathway corresponds to a center line of one or more lanes in which the autonomous vehicle intends to travel.

13. The vehicle control system of claim 11, wherein the projecting the candidate motion plan onto the nominal pathway to determine the projected distance along the nominal pathway for the candidate motion plan, comprises:
determining a plurality of candidate motion plan locations for the candidate motion plan; and
determining the projected distance along the nominal pathway for the candidate motion plan based on a comparison of the plurality of nominal pathway location to the plurality of candidate motion plan locations.

14. The vehicle control system of claim 13, wherein the projected distance along the nominal pathway is based on an L2 distance from at least one of the plurality of candidate motion plan locations to at least one of the nominal pathway locations.

15. The vehicle control system of claim 14, wherein determining the projected distance along the nominal pathway for the candidate motion plan comprises:
evaluating a reward function based on the L2 distance from the at least one of the plurality of candidate motion plan locations to the at least one of the nominal pathway locations.

16. An autonomous vehicle, comprising:
one or more processors; and
one or more tangible, non-transitory, computer-readable media that store instructions that, when executed by the one or more processors, cause the one or more processors perform operations, the operations comprising:
obtaining a candidate motion plan that describes a proposed motion path for the autonomous vehicle;
identifying a nominal pathway associated with the autonomous vehicle, wherein the candidate motion plan deviates from the nominal pathway and wherein the nominal pathway comprises a plurality of nominal pathway locations;
projecting the candidate motion plan onto the nominal pathway to determine a projected distance along the nominal pathway for the candidate motion plan;
selecting the candidate motion plan for implementation based at least in part on the projected distance; and
executing one or more control signals to control the motion of the autonomous vehicle based on the candidate motion plan.

17. The autonomous vehicle of claim 16, further comprising:
assigning one or more weights to the candidate motion plan based on the projected distance for the candidate motion plan; and
selecting the candidate motion plan for implementation based at least in part on the one or more weights.

18. The autonomous vehicle of claim 17, wherein the one or more weights are determined based on a scalar parameter configured to control a smoothness of a projection function for projecting the candidate motion plan onto the nominal pathway.

* * * * *